United States Patent [19]

Ninomiya et al.

[11] Patent Number: 4,884,136
[45] Date of Patent: Nov. 28, 1989

[54] MOTION DETECTION CIRCUIT

[75] Inventors: Yuichi Ninomiya; Yoshimichi Ohtsuka, both of Kawasaki; Yoshinori Izumi, Tokyo; Seiichi Gohshi, Komae; Yoshiaki Shishikui, Yokohama, all of Japan

[73] Assignee: Nippon Hoso Kyokai, Tokyo, Japan

[21] Appl. No.: 250,160

[22] Filed: Sep. 28, 1988

[30] Foreign Application Priority Data

Oct. 2, 1987 [JP] Japan .................................. 62-247790

[51] Int. Cl.$^4$ .............................................. H04N 5/91
[52] U.S. Cl. ...................................... 358/105; 358/136
[58] Field of Search ................................ 358/105, 136

[56] References Cited

U.S. PATENT DOCUMENTS 4,760,446  7/1988  Ninomiya ............................ 358/105
4,785,351  11/1988 Ishikawa ............................. 358/105

Primary Examiner—Howard W. Britton
Attorney, Agent, or Firm—Antonelli, Terry & Wands

[57] ABSTRACT

The motion detection circuit is so constructed that an interframe difference signal is passed through a horizontal direction LPF and a vertical direction LPF in cascade connection, and the interframe difference signal thus obtained is divided by the value obtained by mixing an edge signal of an image and the image level signal of the image by a mixing circuit, thus providing a motion signal.

7 Claims, 4 Drawing Sheets

MOTION DETECTION CIRCUIT

FIELD OF THE INVENTION

The present invention relates to a motion detection circuit for detecting the moving picture-area for a sub-Nyguist sampled (hereinafter simply referred to as sub-sampled) image signal, and more particularly to the motion detection circuit that can be suitably used for an encoder and decoder in an MUSE (Multiple Sub-Nyguist Sampling Encoding) system for transmitting a high definition television signal.

BACKGROUND OF THE INVENTION

Figure 2:
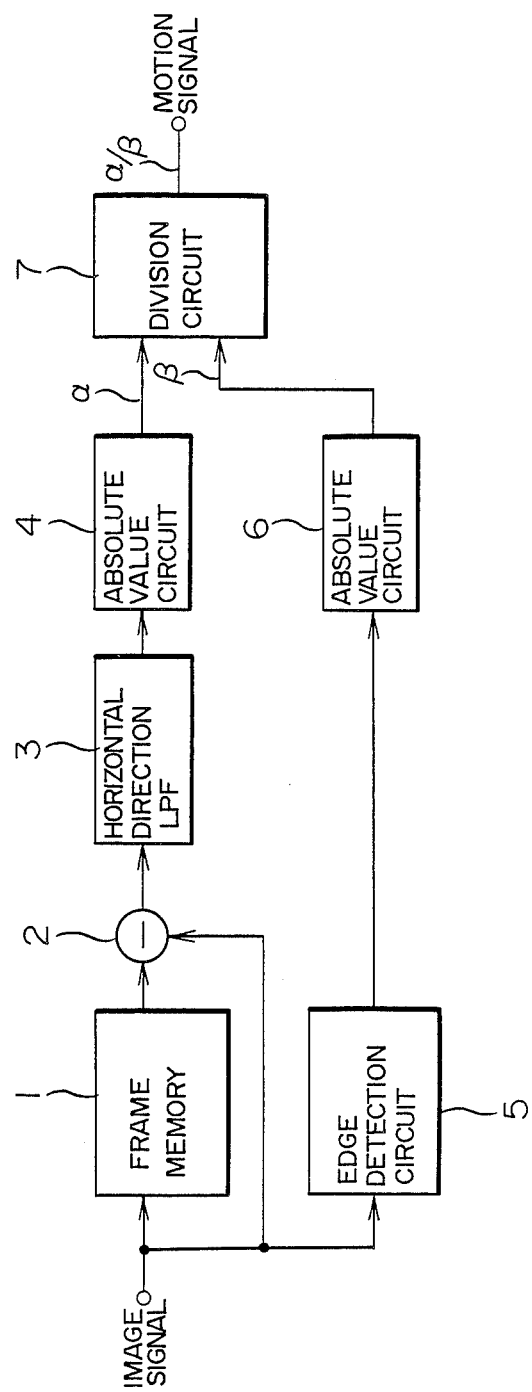
FIG. 2 is a block diagram showing a motion detection circuit according to the prior art.

One exemplary arrangement of the conventional motion detection circuit is shown in FIG. 2. In FIG. 2, 1 is a frame memory and 2 is a substracter which produces an interframe difference signal. 3 is a horizontal direction LPF (low-pass filter) which removes the aliased portion in the horizontal direction of a sub-sampled image signal. 4 is an absolute value circuit which extracts the absolute value (full-wave rectification value) of an output signal from the horizontal direction LPF 3. 5 is an edge detection circuit and 6 is another absolute value circuit, these circuits 5 and 6 serve to detect (differentiate) the signal of an edge portion of an image to extract the absolute value thereof. 7 is a division circuit which performs a division for two input signals $\alpha$ and $\beta$ to produce a motion signal $\alpha/\beta$.

As described above, in the prior art, the motion signal was simply produced by dividing the interframe difference signal passed through the horizontal direction LPF 3 by the detected edge portion signal.

A concrete method for producing a motion signal will be explained below.

Figure 5A:
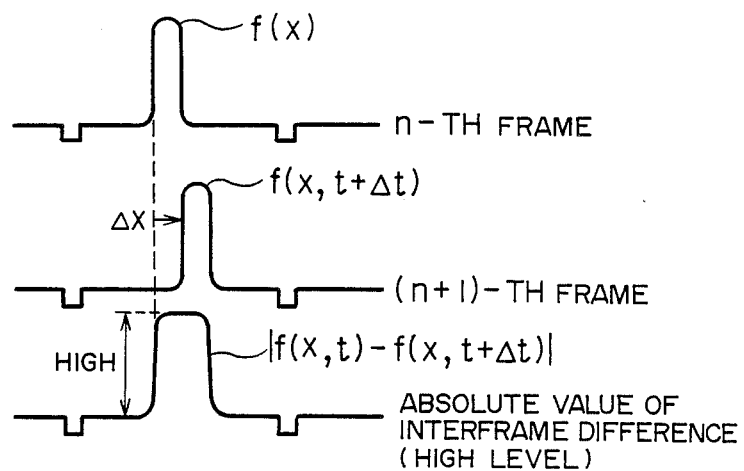
FIGS. 5A and 5B are waveform charts for explaining the creation of a motion signal.
Figure 5B:
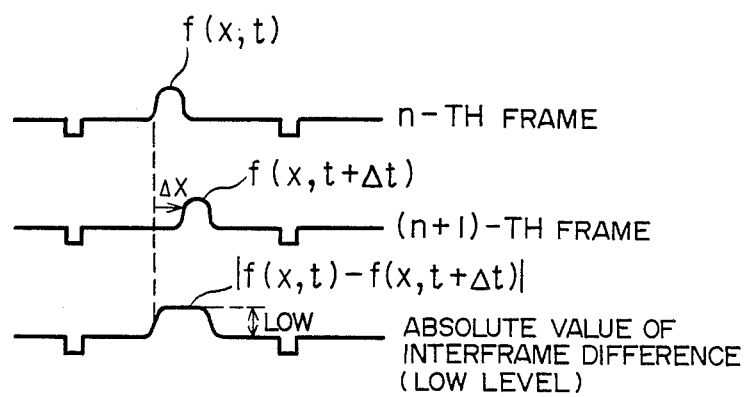

FIGS. 5A and 5B are waveform charts for explaining the operation of producing a motion signal from an image interframe difference. FIG. 5A shows waveforms of adjacent n-th and (n+1)-th frames and of the interframe difference when an image at a comparatively higher level is moved by $\Delta x$. Likewise, FIG. 5B show those when an image at a comparatively lower level is moved by $\Delta x$.

As apparent from the comparison between FIGS. 5A and 5B, the interframe difference waveforms have different amplitudes with the same motion $\Delta x$. The motion $\Delta x$ is required for motion detection so that it is divided by the corresponding image level so as to be normalized.

This can be mathematically explained as follows. The interframe difference can be expressed as $-f(x, t+\Delta t) + f(x, t)$. Wherein, $f(x, t)$ is a preceding frame and $f(x, t+\Delta t)$ is a present frame. When $f(x, t)$ is changed to $f(x+\Delta x, t+\Delta t)$ by being moved by $\Delta x$ after $\Delta t$, $f(x, t) = f(x+\Delta x, t+\Delta t)$ is concluded. Accordingly $-f(x, t+\Delta t)+f(x, t) = -f(x, t+\Delta t)+f(x+\Delta x, t+\Delta t)$. Here, if $t+\Delta t = t$ is set, $f(x+\Delta x, t) - f(x, t)$, $f(x+\Delta x, t)$ is developed in a Taylor's series as $$f(x + \Delta x, t) = f(x, t) + \frac{\Delta x}{o!} f'(x, t) + \ldots$$

$$f(x + \Delta x, t) - f(x, t) = \Delta x \cdot f'(x, t)$$

Thus, the motion $\Delta x$ is expressed by $$\Delta x = \frac{f(x + \Delta x, t) - f(x, t)}{f'(x, t)}$$

Here $f'(x, t) = \frac{\partial}{\partial x} f(x, t)$

Namely, the motion $\Delta x$ can be derived by dividing the interframe difference by the amount of an edge.

However, the method of detecting a moving area using the conventional arrangement as shown in FIG. 2 has the following problems.

1. If there is an edge in an area at a high absolute image level approximately equal to a white peak, the amount of an edge, which is a divisor, is not sufficiently large in the neighborhood of the edge at the white peak. Thus, only the division of the interframe difference by the edge amount provides a relatively large motion value, and so the above area will be erroneously judged to be a moving area.

2. A sub-sampled image signal has aliased portions in the horizontal direction and vertical direction. Thus, the extracted interframe difference involves these aliased portions, and so the area which is actually still will be erroneously judged to be a moving area.

More specifically with respect to the above item 1, when a large edge approximately equal to the white peak moves, a large interframe difference is produced but the dynamic range representative of the edge amount can not take a sufficiently large value as compared to the interframe difference. Particularly, the image with a white peak on a black background does not permit a sufficiently large amount of an edge to be detected. Thus, for example, in the edge at the white peak on a still image, the value obtained by dividing the interframe difference by the edge amount is not so small and so the still image will be erroneously judged to be a moving image.

SUMMARY OF THE INVENTION

An object of the present invention is to provide a motion detection circuit which can surely produce a moving image signal without any error by dividing an interframe difference signal by a mixed value of a detected edge value and the level value of an edge image itself.

In order to attain this object, a motion detection circuit according to the present invention comprises means for producing an interframe difference signal of a sub-sampled image signal, filter means for extracting low frequency components of the interframe difference signal in the horizontal and vertical directions from the output of the producing means, detection means for detecting an edge of the image signal; mixing means for mixing the absolute value of the level of the image signal and the absolute value of an output from the detection means, and division means for dividing the absolute value of an output from the filter means by an output from the mixing means to provide a motion signal.

In accordance with the present invention, the interframe difference signal is divided by the signal produced at the edge of an image and the corresponding level value of the image. The aliased portion in the vertical direction due to sampling can be removed from the interframe difference signal and so an error of motion detection due to this aliased portion can be obviated.

Accordingly, in the case where an image has a vertical edge approximately to a white peak such as a window frame in a building, the aliased portion in the vertical direction can be removed to reproduce a desired image without failing in motion detection.

DESCRIPTION OF THE PREFERRED EMBODIMENTS

A motion detection circuit according to one embodiment of the present invention will be explained in detail with reference to the drawings.

Figure 1:
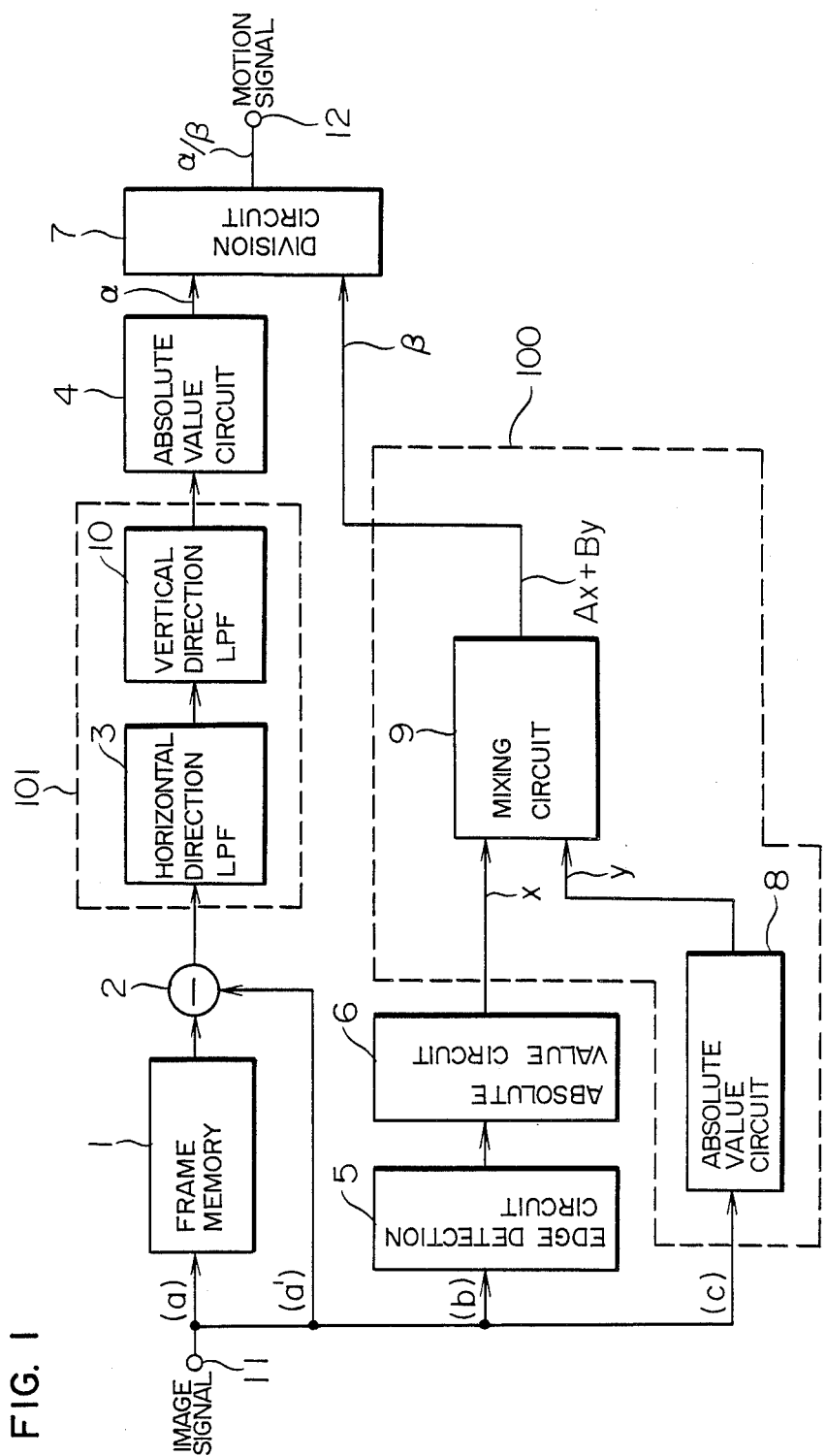
FIG. 1 is a block diagram showing a motion detection circuit according to one embodiment of the present invention.

FIG. 1 shows a schematic arrangement of the motion detection circuit according to one embodiment of the present invention. In FIG. 1, 1 is a frame memory to which an image signal is supplied and 2 is a substracter which produces a interframe difference signal. 101 is an aliased portion removing section which removes the aliased portions in the horizontal direction and vertical direction of a sub-sampled image signal. 4 is an absolute value circuit which produces the absolute value (full-wave rectification value) of an output signal from the aliased portion removing section 101. 5 is an edge detection circuit which detects (differentiates) a signal at the edge portion of the image and 6 is an absolute value circuit which produces the absolute value thereof. 7 is a division circuit which performs a division for two input signals α and β to provide a motion signal α/β, 100 is a mixing section which mixes the detected signal at the edge portion of the image and the corresponding level value of the image at a proper ratio. 8 is an absolute value circuit which produces the absolute value of the image level value. 9 is a mixing circuit which mixes an edge signal x obtained through the edge detection circuit 5 and the absolute value circuit 6 and an image level signal y obtained from the absolute value circuit 8. The mixing section 100 is constituted by the absolute value circuit 8 and the mixing circuit 9. The above 8 is an output from the mixing circuit 9. The aliased portion removing section 101 is constituted by a horizontal direction LPF 3 and a vertical direction LPF 10 in cascade connection. 11 is an input terminal and 12 is an output terminal.

Now referring to FIG. 1, the operations of the respective sections will be explained in detail.

Figure 3:
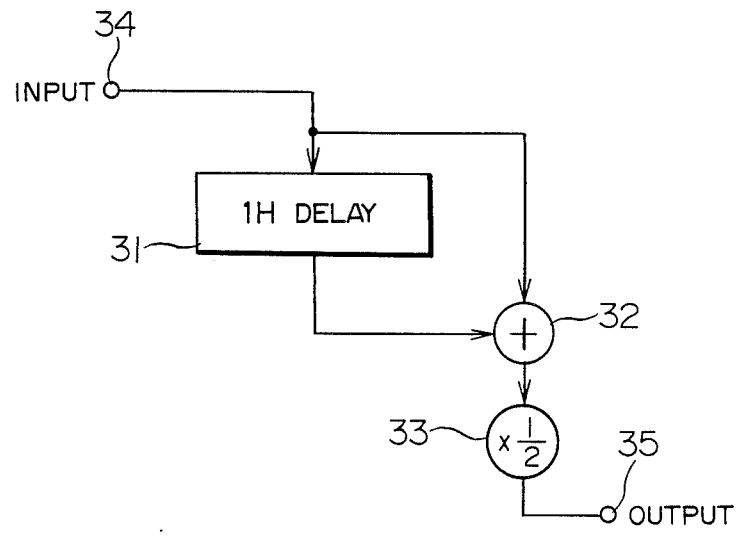
FIG. 3 is a block diagram of one example of a vertical direction LPF (low-pass filter) used in the present invention.
Figure 4:
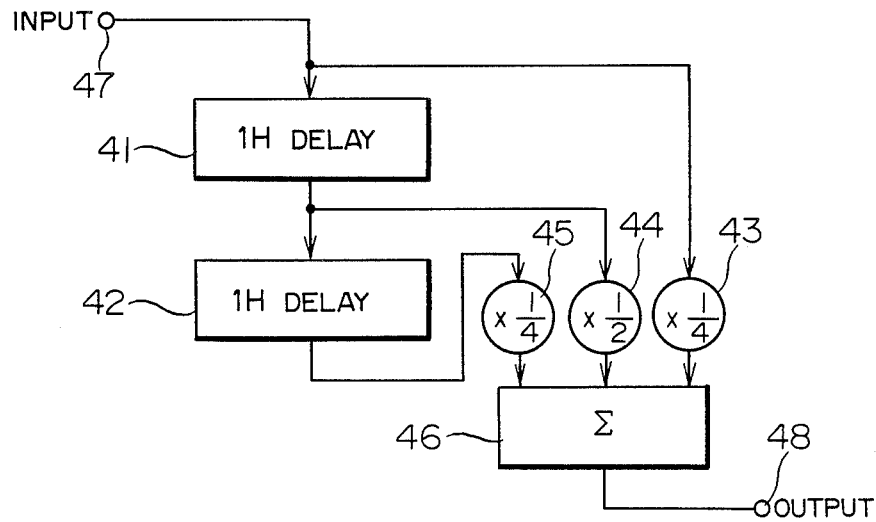
FIG. 4 is a block diagram of another example of a vertical direction LPF used in the present invention.

The sub-sampled image signal is divided, at the input terminal 11 of the motion detection circuit, into three routes:
(1) interframe difference detection
(2) edge detection, and
(3) level detection Route (1) consists of sub-routes (a) and (a'). The one sub-route (a) is lead to the substracter 2 through the frame memory 1 and the other sub-route (a') is directly lead to the substracter 2. An output from the substracter 2 is an interframe difference signal. This signal is subjected to the processings by the horizontal direction LPF 3 and the vertical direction LPF 10. The horizontal direction LPF 3 has a plurality of taps the number of which is dependent upon the spectrum characteristic of an original signal. For example, in MUSE system decoder three or hour horizontal direction LPF's 3 with three to seven taps are used by connecting them in cascade. The vertical direction LPF 10 has a large amount of delay so that the scale of hardware thereof is likely to be large. The vertical direction LPF 10 is desired to have a larger number of taps, but may be a simple LPF such as shown in FIGS. 3 and 4 which will be described later.

The above edge detection route (2) and level detection route (3) are the routes (b) and (c) shown in FIG. 1, respectively. The edge signal x is produced by the edge detection circuit 5 and the absolute value circuit 6 on the route (b) and the image level signal y is produced by the absolute value circuit 8 on the route (c). The signals x and y are mixed by the mixing circuit 9 at a proper ratio (Ax+By). A and B are weighting coefficients arbitrarily determined for x and y, respectively.

Although the mixing circuit 9 performs a linear mixing in the embodiment of FIG. 1, it may perform a non-linear mixing using e.g. a secondary function:

$$Ax^2 + By^2 + Cxy + dx + ey + f$$

The inputs to the mixing circuit may be 6 bits or so for the edge signal and may be higher order 6 bits or so of the image signal for the image level.

Incidentally, the motion detection circuit mentioned above should be provided for both encoder and decoder sides to generate a more desired effect in technical advantage.

One concrete example of the vertical direction LPF 10 shown in FIG. 1 is shown in block from in FIG. 3. In FIG. 3, 31 is a 1 H (one-horizontal-line) delay circuit; 32 is an adder; 33 is a ½ multiplier; 34 is an input terminal; and 35 is an output terminal.

The arrangement shown in FIG. 3 is a well known digital filter which serves as a vertical direction LPF. The operation thereof will be explained below. The interframe difference signal which is an output from the substracter 2 of FIG. 1 is supplied to the input terminal 34 via the horizontal direction LPF 3. The interframe difference signal thus supplied to one terminal of the adder 32 as well as the 1 H delay circuit 31. The output from the 1 H delay circuit 31 is supplied to the other terminal of the adder 32. The interframe difference signal and the output from the 1 H delay circuit 31 are added in the adder 32. The output from the adder 32 is ½-multiplied by the ½ multiplier 33. The output from the ½ multiplier 33 is derived from the output terminal 35 as a interframe difference signal with the vertical direction aliased portion removed.

Another example of the vertical direction LPF 10 shown in FIG. 1 is shown in block form in FIG. 4. In FIGS. 4, 41 and 42 are a 1 H delay circuit, respectively, 43 and 45 are a ¼ multiplier, respectively; 44 is a ½ multiplier; 46 is a summing circuit; 47 is an input terminal and 48 is an output terminal.

The arrangement shown in FIG. 4 is also a well known digital filter which serves as a vertical direction LPF. The operation thereof will be explained below. The interframe difference signal is supplied to the input terminal 47. The interframe difference signal thus supplied is supplied to the 1 H delay circuit 41 and the ¼ multiplier 43. The output from the 1 H delay circuit 41 is 1 H delay circuit 42 and the ½ multiplier 44. The output from the 1 H delay circuit 42 is supplied to the ¼ multiplier 45. The respective outputs from the ½ multiplier 44 and the ¼ multipliers 43 and 45 are supplied to the summing circuit 46 and summed there. The output (summed result) from the summing circuit 46 is derived through the output terminal 48 as a interframe difference signal with the vertical direction aliased portion filtered and removed.

We claim:

1. A motion detection circuit comprising:
   means for producing a interframe difference signal of a sub-sampled image signal;
   filter means for removing, from the interframe difference signal outputted from the producing means, its aliased portion;
   detection means for detecting an edge of the image signal;
   mixing means for mixing an absolute value of a level of the image signal and an absolute value of an output signal from the detection means; and
   dividing means for dividing an absolute value of an output signal from the filter means by an output signal from the mixing means to provide a motion signal.

2. A motion detection circuit according to claim 1, wherein the filter means comprises filter means for removing the aliased portion of the interframe difference signal in the horizontal direction.

3. A motion detection circuit according to claim 1, wherein the filter means comprises filter means for removing the aliased portion of the interframe difference signal in the horizontal direction and another filter means for removing that in the vertical direction.

4. A motion detection circuit according to claim 1, wherein the mixing means non-linearly mixes the absolute value of the level of said image signal and the absolute value of the output signal from the detection means.

5. A motion detection circuit according to claim 1, wherein the producing means for producing the interframe difference signal is constituted by frame memory means and a substracter.

6. A motion detection circuit according to claim 1, wherein the mixing means linearly mixes the absolute value of the level of the image signal and the absolute value of the output signal from the detection means.

7. A motion detection circuit according to claim 6, wherein weighting coefficients are provided to the absolute value of the level of the image signal and the absolute value of the output signal from the detection means, respectively.

* * * * *